United States Patent [19]
Suzuki et al.

[11] Patent Number: 5,927,086
[45] Date of Patent: Jul. 27, 1999

[54] METHOD OF STOPPING AN ABSORPTION REFRIGERATOR

[75] Inventors: Akira Suzuki; Toshimitsu Takaishi, both of Saitama, Japan

[73] Assignee: Honda Giken Kogyo Kabushiki Kaisha, Tokyo, Japan

[21] Appl. No.: 08/984,189

[22] Filed: Dec. 3, 1997

[30]  Foreign Application Priority Data

Dec. 26, 1996  [JP]  Japan .................................. 8-356455

[51] Int. Cl.$^6$ .................................................. F25B 15/00
[52] U.S. Cl. ................................ 62/141; 62/476; 62/112
[58] Field of Search ............................ 62/101, 112, 476, 62/485, 141

[56]  References Cited

U.S. PATENT DOCUMENTS

| | | | |
|---|---|---|---|
| 3,005,318 | 10/1961 | Miner | 62/141 |
| 3,374,644 | 3/1968 | Foster | 62/141 |
| 4,732,008 | 3/1988 | DeVault | 62/79 |
| 4,779,675 | 10/1988 | Stuven et al. | 165/104.12 |
| 5,259,202 | 11/1993 | Nishiguchi et al. | 62/147 |

FOREIGN PATENT DOCUMENTS 8-226722  9/1996  Japan .

*Primary Examiner*—William Doerrler
*Attorney, Agent, or Firm*—Armstrong, Westerman, Hattori, McCleland & Naughton

[57]  ABSTRACT

After a running stop command is released, a pump P2 for transferring a solution from the absorber 2 to a regenerator 3 is kept running. The transfer of the solution permits separation of the solution from a refrigerant during non-operation of the refrigerator. The solution saved in the regenerator 3 remains at as a high concentration of the absorbent as that before the end of the operation while the refrigerant is saved in an evaporator 1. This enables the refrigerator to restart its normal operation corresponding to an operation start command.

8 Claims, 2 Drawing Sheets

METHOD OF STOPPING AN ABSORPTION REFRIGERATOR

BACKGROUND OF THE INVENTION

1. Field of the Invention

The present invention relates to a method of stopping an absorption refrigerator and particularly, a method of stopping an absorption refrigerator in such a manner that the refrigerator will be able to promptly be restarted upon being switched on.

2. Description of the Related Art

In an air-cooling absorption refrigerator using water as a refrigerant and lithium bromide as an absorbent, the absorbent in an absorbent solution is likely to be crystallized during non-running of the refrigerator. For preventing the crystallization of the absorbent, it is common that, when a stopping operation is conducted, circulation pumps for the absorbent solution and the refrigerant are not immediately turned off but are kept running for a while to allow the absorption solution to absorb refrigerant vapor for decreasing the concentration of the absorbent and/or to mix the highly concentrated solution with a diluted solution for dilution of the absorbent solution. For example, a conventional method of stopping the operation of an absorption refrigerator is disclosed in Japanese Patent Laid-open Publication No. Hei 8-226722 in which the diluting operation is terminated when the temperature of a refrigerant drops to a predetermined degree, instead of a known diluting operation controlled simply with a timer, thus avoiding useless running of the refrigerator and decreasing the consumption of electric power to minimize the running cost.

In such a conventional method of stopping the operation, the absorbent solution is saved in a diluted state for preventing the crystallization during stopping of the refrigerator and, when the refrigerator is restarted, the diluted absorbent solution has to be converted by separation of the refrigerant therefrom to a high concentration of the solution for producing a desired level of performance. This requires a length of time from the start up to the normal running. In addition to taking the length of time, such a wasteful operation is needed that the absorbent solution with a concentration suitable for normal running is diluted by using an amount of energy upon stopping the refrigerator and the solution has to be converted back by using another amount of energy from a diluted state to its original suitable concentration when starting again. Accordingly, the efficiency of energy consumption will be lowered.

SUMMARY OF THE INVENTION

It is an object of the present invention to provide a method for stopping an absorption refrigerator in a such manner that the refrigerator can promptly be restarted upon being switched on and the wasteful use of energy will be minimized.

The present invention is characterized in that a solution in an absorber is transferred to a regenerator (and if desired, a refrigerant in a condenser is fed back to an evaporator) in response to a stop command before stopping the operation of an absorption refrigerator which comprises the evaporator for saving the refrigerant to produce a refrigerant vapor, the absorber saving the solution containing the absorbent and absorbing the refrigerant vapor produced in the evaporator to generate absorption heat, the regenerator for receiving the solution from the absorber and heating it to extract the refrigerant vapor for recovering the concentration of the absorbent in the solution, and a condenser for condensing the refrigerant vapor extracted in the regenerator and feeding back a condensed vapor to the evaporator.

In the second aspect of the present invention, substantially the whole amount of the solution (and refrigerant) is transferred. In the third aspect of the present invention, a valve provided across a conduit between the condenser and the evaporator is opened wider than in a normal operation thereof before stopping the refrigerator. It is also characterized in that a pump mounted across a conduit between the absorber and the regenerator is kept energized, after a stop command of the refrigerator is issued, until there is substantially no solution in the absorber, and that trifluoroethanol is used as the refrigerant and a combination of the refrigerant and the absorbent is utilized as a medium pair for carrying out a cycle action of absorption refrigeration.

According to the present invention, the absorbent solution is substantially separated from the refrigerant and saved in the regenerator (and, if desired, the refrigerant in the condenser is passed to and saved in the evaporator) during non-operation of the refrigerator. This prevents refrigerant vapor from being absorbed by the absorbent, hence allowing the absorbent solution to be kept at a high concentration equivalent to that before stopping the operation. When the pressure reducing valve is opened, the refrigerant is automatically transferred back from the condenser to the evaporator by a pressure difference between the two devices. After the stop operation is demanded, the running of the pump for a short period of time conveys the solution to the regenerator. In particular, while the pressure reducing valve remains open, the load to the pump can be reduced. Since trifluoroethanol has a wide non-crystalline range, the absorbent solution will hardly be crystallized if it is kept at a high concentration in the regenerator.

DETAILED DESCRIPTION OF THE PREFERRED EMBODIMENT

Figure 1:
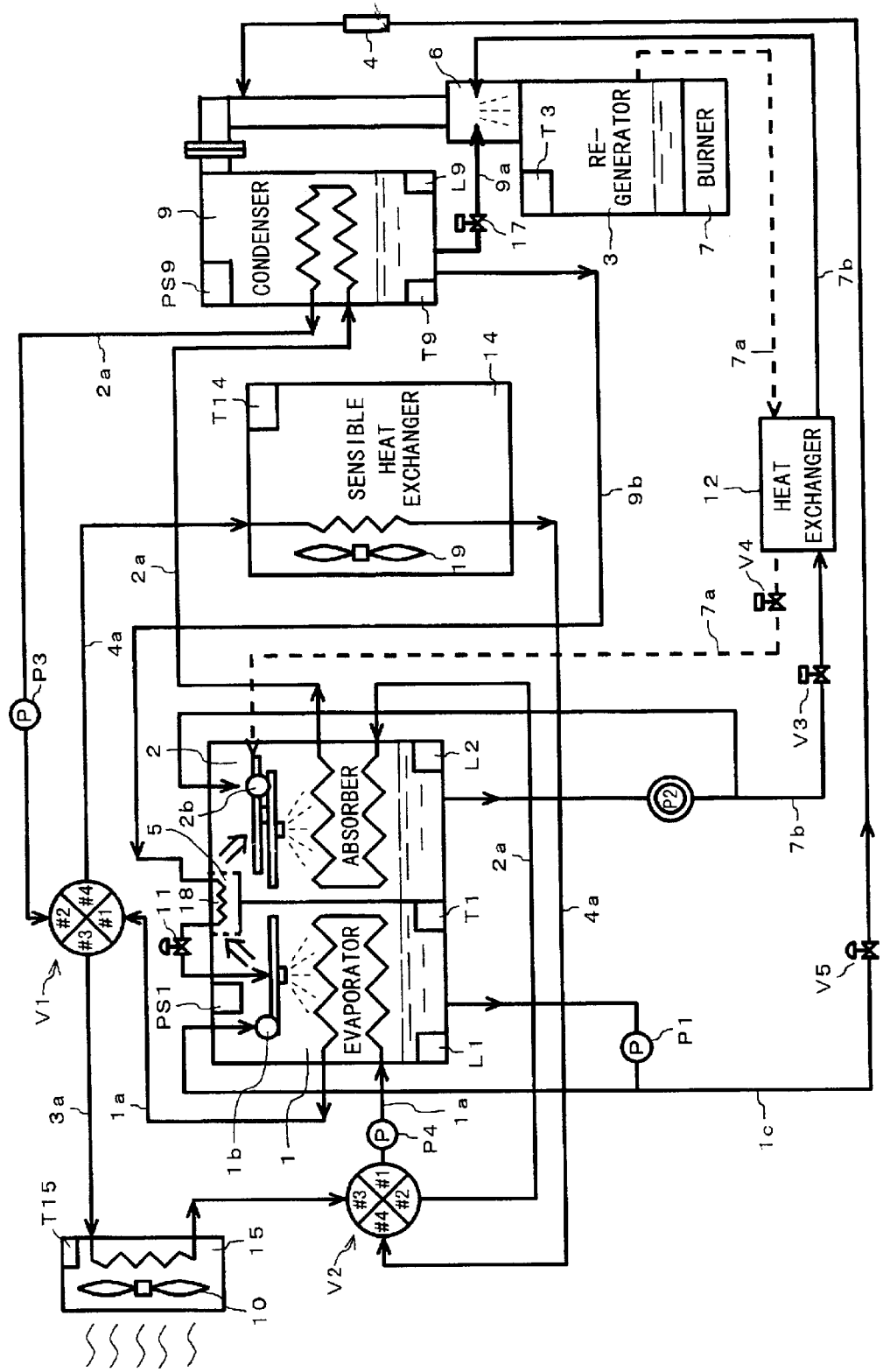
FIG. 1 is a schematic view of an absorption refrigerator according to an embodiment of the present invention.

The present invention will be described in detail referring to the accompanying drawings. FIG. 1 is a schematic block view of a primary part of the absorption refrigerator showing an embodiment of the present invention. The absorption cooling/heating apparatus described below is regarded as an example of an absorption refrigerator.

An evaporator 1 is filled with a refrigerant of fluoride alcohol, such as trifluoroethanol (TFE), while an absorber 2 is filled with a solution of DMI derivative, such as dimethylimidazolidinon which contains an absorbent. The refrigerant is not limited to fluoride alcohol but may be an appropriate agent of which its nonfreezing range is wide. The solution also is not limited to the DMI derivative and it may be any other absorbent solution which is wide in the nonfreezing range, being higher than TFE in the atmospheric temperature boiling point and having an enough power to absorb TFE. For example, a combination of water and lithium bromide is unfavorable as the solution in the present embodiment, since water, as a refrigerant, may be frozen by temperature drop of the solution during the operation of the heating mode with the outside air temperature being about zero degree.

The evaporator 1 and the absorber 2 are fluidically communicated with each other by a (refrigerant) vapor passage 5. When inside spaces of the evaporator 1 and the absorber 2 are kept under a low pressure condition, for example, at 30 mmHg, the refrigerant is evaporated in the evaporator 1 and transferred via the passage to the absorber 2. A pre-cooler 18 may be mounted across the vapor passage. In the pre-cooler 18, a mist of the refrigerant which remains in the refrigerant vapor is heated for evaporation as well as the temperature of TFE fed back from the condenser 9 is lowered. The refrigerant vapor is absorbed by the absorbent solution in the absorber 2 thus generating an absorption refrigerating action.

When a burner 7 is lit to heat up a regenerator 3 for increasing the concentration of the absorbent solution in the absorber 2, the absorbent absorbs the refrigerant vapor in the absorber 2 and the evaporation of the refrigerant in the evaporator 1 is accelerated hence cooling down the interior of the evaporator 1 with the latent heat of the refrigerant evaporation. The burner, the regenerator, and the concentration of the absorbent solution will be described later in more detail. A tube 1a for passing a chilled water is mounted to run through the evaporator 1. The tube 1a is connected at one end (the exit side in the embodiment shown) to the No.1 opening of a first four-way valve V1 and at the other end (the entrance side in the embodiment) to the No.1 opening of a second four-way valve V2.

The refrigerant is fed by the action of a pump P1 to a spraying means 1b mounted in the evaporator 1 for being sprayed over the tube 1a in which the chilled water runs. The refrigerant deprives the chilled water in the tube 1a of heat and turns to a vapor which passes via the vapor passage 5 into the absorber 2. Consequently, the temperature of the chilled water is more declined. The refrigerant in the evaporator 1 is not only fed to the spraying means 1b, but a small part of it is supplied via a filter 4 to a rectifier 6, which will be explained later. A flow valve V5 is mounted between the evaporator 1 and the filter 4. The chilled water running in the tube 1a may preferably be either an ethylene glycol or propylene glycol water solution.

As the refrigerant vapor or a vapor of fluoride alcohol is absorbed by the solution in the absorber 2, the absorption heat increases the temperature of the solution. The lower the temperature and the higher the concentration of the solution, the greater the absorbing capability of the solution will be. For attenuating the temperature increase of the solution, a tube 2a is provided in the absorber 2 for passing a flow of cooling water. The tube 2a is connected at one end (the exit side in the embodiment shown) via a condenser 9 and a pump P3 to the No.2 opening of the first four-way valve V1 and at the other end (the entrance side) to the No.2 opening of the second four-way valve V2. Preferably, the cooling water running along the tube 2a is the same as the chilled water in properties or constitution.

The absorbent solution is fed by the action of the pump P2 to a spraying means 2b mounted in the absorber 2 for being sprayed over the tube 2a. Consequently, the solution is cooled down by the cooling water running along the tube 2a. Simultaneously, the cooling water deprives the solution of heat and its temperature will increase. As the solution in the absorber 2 has absorbed the refrigerant vapor, the concentration of the absorbent drops thus lowering the absorbing capability of the solution.

The diluted solution which has absorbed the refrigerant vapor in the absorber 2 is passed via a tube 7b and a control valve V3 to the rectifier 6 and the regenerator 3 as well as fed to the spraying means 2b by the pump P2. The regenerator 3 is provided with the burner 7 for heating up the diluted solution. The burner 7 may be a gas burner or any other heating means. The solution is heated in the regenerator 3 and the concentration of the absorbent is increased as the refrigerant vapor is separated. The resultant (concentrated) solution is returned via a tube 7a and a control valve V4 to the absorber 2 where it is sprayed over the tube 2a by the spraying means 2c.

When the diluted solution fed to the regenerator 3 is heated with the burner 7, it releases a refrigerant vapor. As the absorbent mixed in the refrigerant vapor has been removed in the rectifier 6, the refrigerant vapor of a higher purity is supplied to the condenser 9 where it is cooled down to be liquidized. Then, a resultant liquid form of the refrigerant is returned via the tube 9b, the pre-cooler 18, and the pressure reducing valve 11 to the evaporator 1 where it is sprayed over the tube 1a.

Although the purity of the refrigerant fed back from the condenser 9 is fairly high in the evaporator 1, it may or must gradually be declined because a vary small amount of the absorbent intermixed in the circulated vapor is accumulated during a long period of the cycle operation. For recovering the purity of the refrigerant, as mentioned above, a small portion of the refrigerant from the evaporator 1 is preferably sent through the valve 5 and the filter 4 to the rectifier 6 where it is mixed with the refrigerant vapor from the regenerator 3.

A heat exchanger 12 is provided in the middle way of the tubes 7a and 7b which respectively connect the absorber 2 and the rectifier 6. The absorbent solution at high concentration and high temperature which runs along the tube 7a from the regenerator 3 is subjected to a heat exchanging action of the heat exchanger 12 with the diluted solution which runs along the tube 7b from the absorber 2, hence being cooled before it is fed to the absorber 2 where it is sprayed. In reverse, the diluted solution is preheated by the action of the heat exchanger 12 and passed to the rectifier 6. This will surely improve the thermal efficiency in the apparatus. In addition, another heat exchanger (not shown) may be provided for transferring heat from the concentrated solution to the cooling water which runs along the tube 2a from the absorber 2 or the condenser 9. Accordingly, the temperature of the concentrated solution returned to the absorber 2 will be reduced further while the temperature of the cooling water will be more increased.

A sensible heat exchanger 14 is also provided with a tube 4a for heat exchange between the cooling water or the chilled water and the outside air and an indoor unit 15 is provided with a tube 3a. The tubes 3a and 4a are connected at one end (the entrance side in the embodiment shown) to the No.3 and No.4 openings of the first four-way valve V1 respectively and at the other end (the exit side) to the No.3 and No.4 openings of the second four-way valve V2, respectively. The indoor unit 15 is located in a room to be airconditioned and includes a fan 10 used in common for blowing out either cooling air and heating air from its blowing window (not shown). The sensible heat exchanger 14 is normally placed in the outdoors and includes a fan 19 for forcedly exchanging heat with the outside air.

The evaporator 1 is accompanied with a level sensor L1 for detecting the amount of the refrigerant, a thermal sensor T1 for measuring the temperature of the refrigerant, and a pressure sensor PS1 for detecting the pressure in the evaporator 1. The absorber 2 is equipped with a level sensor L2 for detecting the amount of the solution. The condenser 9 is provided with a level sensor L9 for detecting the amount of a condensed refrigerant, a thermal sensor T9 for measuring the temperature of the refrigerant, and a pressure sensor PS9 for detecting the pressure in the condenser 9. The sensible heat exchanger 14, the regenerator 3, and the indoor unit 15 are equipped with thermal sensors T14, T3, and T15, respectively. The thermal sensor T14 of the sensitive heat exchanger 14 measures the temperature of outside air while the thermal sensor T15 of the indoor unit 15 detects the temperature in a room to be airconditioned. The thermal sensor T3 of the regenerator 3 detects the temperature of the absorbent solution.

In the cooling action of the above arrangement, the first and the second four-way valves and V1 V2 are switched to connect between the No.1 and No.3 openings and between the No.2 and No.4 openings, respectively. Accordingly, the chilled water which has been cooled down with spraying of the refrigerant over the tube 1a, is conveyed to the tube 3a in the indoor unit 15 for cooling the room.

In operation of the heating mode, the first and the second four-way valves V1 and V2 are actuated so that the No.1 and No.4 openings are communicated to each other and the No.2 and No.3 openings are communicated to each other. Accordingly, the cooling water heated in the tube 2a is passed to the tube 3a in the indoor unit 15 for heating up the room.

When the outside air temperature extremely drops, the sensible heat exchanger 14 hardly pumps up heat from the outside air thus lowering the heating capability. Preparing for such condition, there is provided with a bypass passage 9a with a switching valve 17 between the condenser 9 and regenerator 3 (or rectifier 6). With such a very low temperature at the outside, the thermodynamic heating is halted and the refrigerant vapor generated in the regenerator 3 is circulated back from the condenser 9 to the regenerator 3 to enable the direct flame heating mode in which heat produced by the burner 7 is transferred with high efficiency to the cooling water which runs through the tube 2a in the condenser 9, thus contributing to raising the temperature of the cooling water and the increase of the heating capability in the apparatus.

The procedure of stopping the absorption cooling/heating apparatus according to the present invention will now be explained. In this embodiment, in response to the issuance of a stop command by a user, a substantially full amount of the solution in the absorber 2 is transferred to the regenerator 3 (and if desired, a substantially full amount of the refrigerant in the condenser 9 is moved to the evaporator 1, too) before the apparatus is completely deenergized. This prevents the refrigerant in the evaporator 1 from being absorbed by the absorbent solution. Also, when the refrigerant in the condenser 9 is transferred to the evaporator 1, the absorption of the refrigerant vapor generated in the condenser 1 by the absorbent solution in the regenerator 3 is avoided during the non-operation of the apparatus and declination of the concentration in the absorbent solution will be prevented in the regenerator 3.

For transferring the refrigerant to the evaporator 1, the pressure reducing valve 11 is opened. As the pressure in the condenser 9 is higher than that in the evaporator 1, the opening of the pressure reducing valve 11 permits the refrigerant to automatically flow into the evaporator 1. Preferably, the pressure reducing valve 11 is fully opened. The transfer of the refrigerant may be terminated by a timer being set for closing the pressure reducing valve 11 when a predetermined length of time has elapsed after the opening, or the level sensor L9 can be arranged for closing the pressure reducing valve 11 when the level (or the amount) of the refrigerant in the condenser 9 drops to a predetermined setting value (including zero).

For feeding the solution from the absorber 2 to the regenerator 3, the open/close valve V4 mounted across the tube 7a between the heat exchanger 12 and the absorber 2 is closed, the valve V3 across the tube 7b is preferably fully opened, and the pump P2 is turned on. The termination of the feeding of the solution, similar to the transfer of the refrigerant from the condenser 9, may be controlled by a length of operating time after the turning on of the pump P2 or monitoring the level of the solution in the absorber 2 (for example, timing with level 0). When the pump P2 is activated, as described above, a portion of the absorbent solution is fed into the spraying means 2a in the absorber 2. An extra open/close valve (not shown) may preferably be mounted between the pump P2 and the spraying means 2b, which valve is closed when the operation is finished, for allowing the absorbent solution to quickly flow from the absorber 2 to the regenerator 3.

A procedure of restarting the apparatus after stopping it by the above mentioned manner will be explained referring to the cooling mode running. The procedure starts with ignition of the burner 7 for increasing the pressure in the regenerator 3. Then, both the pump P1 for the evaporator 1 and the pump P4 for circulation of the chilled water are turned on. The action of the pump P1 gets ready for spraying the refrigerant in the evaporator 1, while the action of the pump P4 feeds the chilled water into the indoor unit 15. When the pressure in the regenerator 3 rises up to a predetermined rate, the open/close valve V4 is opened to supply the condensed solution to the absorber 2. This is followed by turning on a cooling water pump or the pump P3 for radiation of condensation heat and absorption heat from the sensitive heat exchanger 14 to start a cycle of refrigeration.

Figure 2:
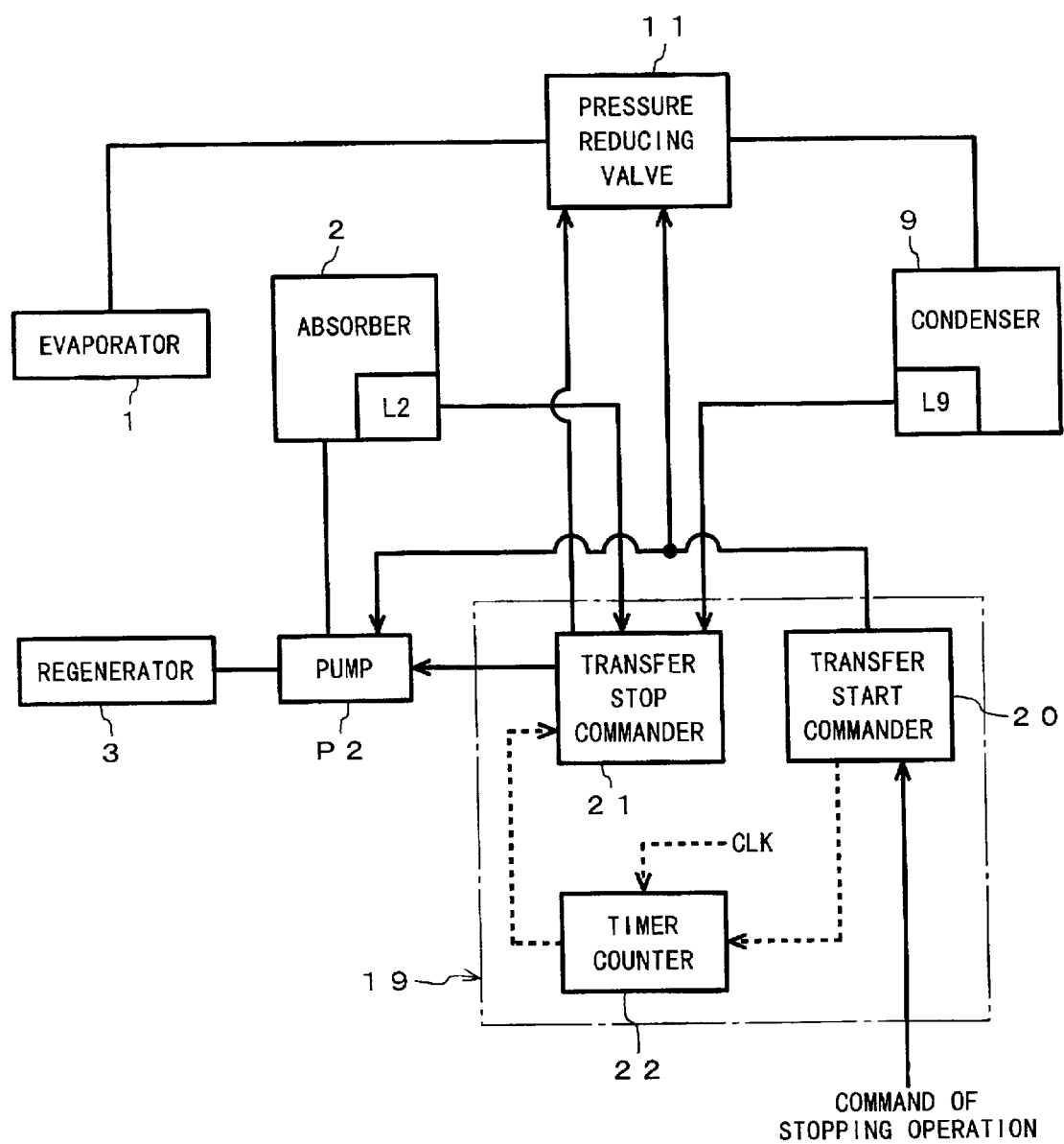
FIG. 2 is a functional block diagram showing a controlling action of the absorption refrigerator according to the embodiment of the present invention.

An operation of the controlling means for carrying out the foregoing method of stopping the operation will be described referring to the block diagram of FIG. 2 in which a controller 19 may commonly be a microcomputer. The controller 19 receives detection signals from the level sensors L2 and L9 which measure the amount of the solution in the absorber 2 and the amount of the refrigerant in the condenser 9, respectively. In response to a command of stopping the operation given by a user, a transfer start commander 20 releases control signals for closing the open/close valve V4 and opening the pressure reducing valve 11 and, in addition, a control signal for continuing the action of the pump P2. Then, the pressure reducing valve 11 is fully opened corresponding to the control signal and the pump P2 remains turned on. The controller 19 monitors the level signals from the level sensors L2 and L9 and, when the signals reach their limit (indicating the level of or close to "empty"), directs a transfer stop commander 21 to release signals for closing the pressure reducing valve 11 and turning off the pump P2.

A timer counter 22 is provided for controlling the duration of transferring the solution or refrigerant. When the timer counter 22 receives a signal from the transfer start commander 20, it starts counting and produces a count-up signal when the count reaches a predetermined value. The count-up signal is delivered to the transfer stop commander 21. Upon receiving the count-up signal, the transfer stop commander 21 delivers the stop signals to the pump P2 and the pressure reducing valve 11. It is preferable to have a couple of the timer counters 22 for detecting the end of feeding the refrigerant and the absorbent solution, respectively.

As set forth above, the present invention allows the absorbent solution and the refrigerant to be kept separately at substantially equal rates of concentration to those at the end of the operation when the operation is stopped. Accordingly, the length of time required for separating the absorbent solution and the refrigerant from each other to recover their concentration rates is eliminated, as compared with the conventional manner, and the apparatus can promptly reach its normal performance level of operation after it is turned on. In particular, this advantage is especially emphasized by the fact that the absorption of the refrigerant by the absorbent is interrupted so as not to dilute the absorbent solution.

In addition, the opening of the pressure reducing valve permits the refrigerant to be automatically moved from the condenser to the evaporator by the action of a pressure difference between the two devices. Especially, the opening of the pressure reducing valve can also minimize the load to the pump. Because of trifluoroethanol contained in the absorbent solution saved in the regenerator, the absorbent solution is hardly crystallized at as a high concentration as during the operation and can be handled with much ease.

What is claimed is:

1. A method of stopping an operation of an absorption refrigerator which includes an evaporator for storing a refrigerant to produce a refrigerant vapor, an absorber for storing a solution containing an absorbent and for absorbing the refrigerant vapor produced in the evaporator to generate absorption heat, a regenerator for receiving the solution and absorbed refrigerant vapor from the absorber and heating it to extract the refrigerant vapor for recovering the concentration of the absorbent in the solution, and a condenser for condensing the refrigerant vapor extracted in the regenerator, and delivering a condensed vapor to the evaporator, the method comprising the steps of:

transferring a substantially full amount of the solution from the absorber to the regenerator in response to an operation stop command and then, stopping the operation of the absorption refrigerator.

2. A method of stopping an operation of an absorption refrigerator according to claim 1, wherein a pump is disposed in a conduit along which the solution is transferred from the absorber to the regenerator and including the step of: when the operation stop command is initiated, continuously running said pump until the solution in the absorber drops to a predetermined level between full and empty.

3. A method of stopping an operation of an absorption refrigerator according to claim 2, including the step of: providing a timer, and running said pump for a selected period of time as determined by said timer.

4. A method of stopping an operation of an absorption refrigerator according to claim 1, including the step of transferring the refrigerant in the condenser to the evaporator before the absorption refrigerator completely ceases its operation.

5. A method of stopping an operation of an absorption refrigerator according to claim 4, wherein, in the transfer of the refrigerant from the condenser to the evaporator, a substantially full amount of the refrigerant is transferred.

6. A method of stopping an operation of an absorption refrigerator according to claim 4, comprising the steps of: providing a pressure reducing valve in a conduit along which the refrigerant is transferred from the condenser to the evaporator, and, when the operation stop command is released, opening the pressure reducing valve wider than in a normal running operation until a level of the refrigerant in the condenser drops to a predetermined level between full and empty.

7. A method of stopping an operation of an absorption refrigerator according to claim 6, including the steps of: providing a second timer, and maintaining the pressure reducing valve opened wider than in the normal running operation thereof for a period of time set by the second timer.

8. A method of stopping an operation of an absorption refrigerator according to claim 1, wherein the refrigerant is trifluoroethanol and a combination of the refrigerant and the absorbent is utilized as a medium pair for carrying out a cycle action of absorption refrigeration.

* * * * *